US012711003B2

(12) United States Patent
Werner et al.

(10) Patent No.: US 12,711,003 B2
(45) Date of Patent: Aug. 18, 2026

(54) HEALTH SIGNATURE BASED LOAD SHIFTING FOR PART LONGEVITY

(71) Applicant: INTERNATIONAL BUSINESS MACHINES CORPORATION, Armonk, NY (US)

(72) Inventors: John S. Werner, Fishkill, NY (US); Arkadiy O. Tsfasman, Wappingers Falls, NY (US); John Torok, Poughkeepsie, NY (US); Luke L. Jenkins, Poughkeepsie, NY (US); Noah Singer, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/636,346

(22) Filed: Apr. 16, 2024

(65) Prior Publication Data

US 2025/0321814 A1 Oct. 16, 2025

(51) Int. Cl.
*G06F 11/00* (2006.01)

(52) U.S. Cl.
CPC ........ *G06F 11/004* (2013.01); *G06F 2201/81* (2013.01)

(58) Field of Classification Search
CPC ..................................................... G06F 11/004
See application file for complete search history.

(56) References Cited

U.S. PATENT DOCUMENTS 10,690,556 B1 6/2020 Quintana
10,938,390 B2 3/2021 Camacho et al.
11,809,911 B2 * 11/2023 Dawkins ................. G06F 9/505
2018/0167654 A1 * 6/2018 Srinivasan ......... H04N 21/2407
2019/0294782 A1 * 9/2019 Cudak ..................... G06F 21/56
2024/0345876 A1 * 10/2024 Khosrowpour ........ G06N 20/00
2025/0278304 A1 * 9/2025 Arachie ................ G06F 9/5044

FOREIGN PATENT DOCUMENTS

CN 115249126 A * 10/2022 ............. G06Q 50/06

OTHER PUBLICATIONS

Anonymous, Dynamic reconfiguration based on system health and cost, An IP.com Prior Art Database Technical Disclosure, IP.com No. IPCOM000019276D, Original Publication Date: Sep. 9, 2003, IP.com Electronic Publication Date: Sep. 9, 2003, 5 pages.
Anonymous, Resource-Management Mechanism for Business-Critical Workloads, An IP.com Prior Art Database Technical Disclosure, IP.com No. IPCOM000271012D, IP.com Electronic Publication Date: Sep. 27, 2022, 6 pages.

(Continued)

*Primary Examiner* — Amine Riad
(74) *Attorney, Agent, or Firm* — Onyx IP Group

(57) ABSTRACT

Methods, systems, and products for health signature based load shifting for part longevity may include monitoring one or more variables associated with each of multiple redundant parts of a computing system, where one or more of the redundant parts are experiencing a load, generating, based on the monitored variables, a health signature for each of the redundant parts, and shifting, based on the health signatures, the load between the redundant parts.

20 Claims, 5 Drawing Sheets

(56) References Cited

OTHER PUBLICATIONS

David Knapp, Additional Considerations When Selecting Rack-Mount Power Distribution Units (PDUs) and Power Strips, Chatsworth Products, White Paper, https://www.chatsworth.com/en-us/documents/white-papers/additional_considerations_selecting_pdus_wp.pdf, Published Jan. 2019 (version Apr. 2, 2020), 16 pages.
Mark Evans, PowerEdge MX Power Redundancy, DELL EMC, PowerEdge Product Group, Direct from Development, https://dl.dell.com/manuals/all-products/esuprt_solutions_int/esuprt_solutions_int_solutions_resources/servers-solution-resources_white-papers27_en-us.pdf, 2018, printed Feb. 7, 2024, 4 pages.
Ogle et al., Full Redundancy vs. Fault Tolerant Redundancy for PowerEdge Server PSUs, DELL Technologies, Direct from Development, https://infohub.delltechnologies.com/p/full-redundancy-vs-fault-tolerant-redundancy-for-poweredge-server-psus/, dated Jan. 16, 2023, 5 pages.
Pelley et al., Power Routing: Dynamic Power Provisioning in the Data Center, ASPLOS XV: Proceedings of the fifteenth International Conference on Architectural support for programming languages and operating systems, https://web.eecs.umich.edu/~twenisch/papers/asplos10.pdf, https://doi.org/10.1145/1736020.1736047, dated Mar. 2010, 12 pages.

* cited by examiner

HEALTH SIGNATURE BASED LOAD SHIFTING FOR PART LONGEVITY

BACKGROUND

Field of the Disclosure

The field of the disclosure is data processing, or, more specifically, methods, systems, and products for health signature based load shifting for part longevity.

Description of Related Art

Many systems implement multiple redundant parts for increased system reliability and for increasing the longevity of parts. The system may be configured to alternate between redundant parts to increase the longevity of the parts. However, different redundant parts may age at different rates, which can lead to an imbalance in part longevity.

SUMMARY

Methods and systems for health signature based load shifting for part longevity according to various embodiments are disclosed in this specification. In accordance with one aspect of the present disclosure, a method of health signature based load shifting for part longevity may include monitoring one or more variables associated with each of multiple redundant parts of a computing system, where one or more of the redundant parts are experiencing a load, generating, based on the monitored variables, a health signature for each of the redundant parts, and shifting, based on the health signatures, the load between the redundant parts.

In accordance with another aspect of the present disclosure, health signature based load shifting for part longevity may include a computing system including: memory, multiple redundant parts, where one or more of the redundant parts are experiencing a load, and a processor configured to: monitor one or more variables associated with each of the redundant parts, generate, based on the monitored variables, a health signature for each of the redundant parts, and shift, based on the health signatures, the load between the redundant parts.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

Figure 1:
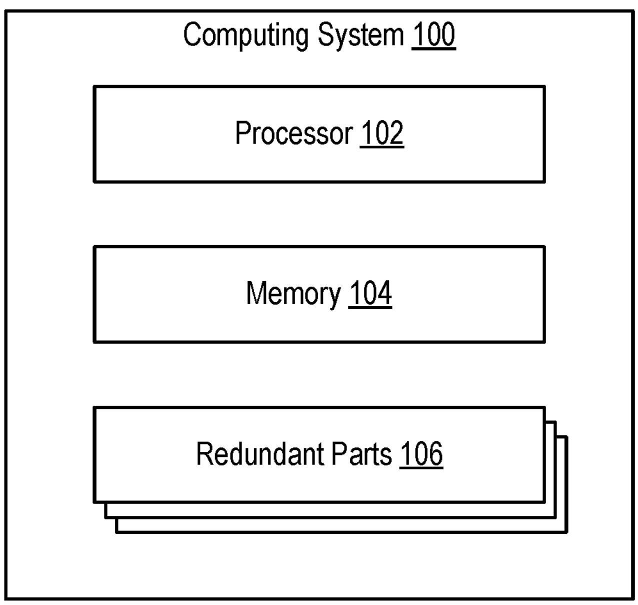
FIG. 1 shows an example line drawing of a system configured for health signature based load shifting for part longevity in accordance with embodiments of the present disclosure.

In accordance with one aspect of the present disclosure, a method of health signature based load shifting for part longevity may include monitoring one or more variables associated with each of multiple redundant parts of a computing system, where one or more of the redundant parts are experiencing a load, generating, based on the monitored variables, a health signature for each of the redundant parts, and shifting, based on the health signatures, the load between the redundant parts. Such an embodiment allows for increased system efficiency by increasing part longevity of the redundant parts of the system by shifting load between redundant parts to maintain even health across all of the parts.

In another embodiment, the method of health signature based load shifting for part longevity also includes monitoring, after shifting the load, the one or more variables of the redundant parts, including updating the health signature of each of the redundant parts. Such an embodiment allows for increased system efficiency by continually monitoring the variables and keeping the health signatures updated for future load shifts.

In another embodiment, in the method of health signature based load shifting for part longevity, the health signature is a vector, with each element of the vector corresponding to a different variable of the one or more variables. Such an embodiment allows for increased part longevity by considering the entire health of a part (all aspects of the part's health) when shifting loads between redundant parts.

In another embodiment, in the method of health signature based load shifting for part longevity, generating the health signature for each of the redundant parts includes weighting each element of the vector based on historical data associated with each of the redundant parts. Such an embodiment allows for increased part longevity by considering how each variable impacts the health of the part, leading to health signatures that more accurately represent the health of the parts.

In another embodiment, in the method of health signature based load shifting for part longevity, shifting the load is based on comparing each of the health signatures. Such an embodiment allows for increased part longevity by considering the health of all of the redundant parts when shifting the load, not just the part experiencing the load.

In another embodiment, in the method of health signature based load shifting for part longevity, shifting the load is performed in response to determining that the health signature of a redundant part experiencing the load differs from one or more of the health signatures by an amount greater than a threshold. Such an embodiment allows for increased system efficiency by shifting load only when required based on a threshold.

In another embodiment, in the method of health signature based load shifting for part longevity, the threshold is based on an allowed Euclidian distance between the vectors. Such an embodiment allows for increased system efficiency by shifting load only when required based on a threshold.

In another embodiment, in the method of health signature based load shifting for part longevity, shifting the load is based on a predicted upcoming workload. Such an embodiment allows for increased system efficiency by taking into account upcoming workloads when shifting load.

In another embodiment, in the method of health signature based load shifting for part longevity, shifting the load includes changing one or more operating parameters of a redundant part experiencing at least a portion of the load. Such an embodiment allows for increased part longevity by altering parts to even out the overall health of the parts.

In another embodiment, in the method of health signature based load shifting for part longevity, shifting the load includes periodically alternating between each of the plurality of redundant parts. Such an embodiment allows for increased part longevity by sharing the load across all of the redundant parts.

In accordance with another aspect of the present disclosure, health signature based load shifting for part longevity may include a computing system including: memory, multiple redundant parts, where one or more of the redundant parts are experiencing a load, and a processor configured to: monitor one or more variables associated with each of the redundant parts, generate, based on the monitored variables, a health signature for each of the redundant parts, and shift, based on the health signatures, the load between the redundant parts. Such an embodiment allows for increased system efficiency by increasing part longevity of the redundant parts of the system by shifting load between redundant parts to maintain even health across all of the parts.

In another embodiment, each of the plurality of redundant parts comprise a power supply unit (PSU).

In another embodiment, each of the plurality of redundant parts comprise a power distribution unit (PDU).

In another embodiment, the processor is further configured to monitor, after shifting the load, the one or more variables of the plurality of redundant parts, including updating the health signature of each of the plurality of redundant parts. Such an embodiment allows for increased system efficiency by continually monitoring the variables and keeping the health signatures updated for future load shifts.

In another embodiment, the health signature is a vector, with each element of the vector corresponding to a different variable of the one or more variables. Such an embodiment allows for increased part longevity by considering the entire health of a part (all aspects of the part's health) when shifting loads between redundant parts.

In another embodiment, generating the health signature for each of the redundant parts includes weighting each element of the vector based on historical data associated with each of the redundant parts. Such an embodiment allows for increased part longevity by considering how each variable impacts the health of the part, leading to health signatures that more accurately represent the health of the parts.

In another embodiment, shifting the load is based on comparing each of the health signatures. Such an embodiment allows for increased part longevity by considering the health of all of the redundant parts when shifting the load, not just the part experiencing the load.

In another embodiment, shifting the load is performed in response to determining that the health signature of a redundant part experiencing the load differs from one or more of the health signatures by an amount greater than a threshold. Such an embodiment allows for increased system efficiency by shifting load only when required based on a threshold.

In another embodiment, the threshold is based on an allowed Euclidian distance between the vectors. Such an embodiment allows for increased system efficiency by shifting load only when required based on a threshold.

In accordance with another aspect of the present disclosure, health signature based load shifting for part longevity may include a computer program product including a computer readable storage medium and computer program instructions stored therein that, when executed, are configured to: monitor one or more variables associated with each of the redundant parts, generate, based on the monitored variables, a health signature for each of the redundant parts, and shift, based on the health signatures, the load between the redundant parts. Such an embodiment allows for increased system efficiency by increasing part longevity of the redundant parts of the system by shifting load between redundant parts to maintain even health across all of the parts.

Exemplary methods, systems, and products for health signature based load shifting for part longevity in accordance with the present disclosure are described with reference to the accompanying drawings, beginning with FIG. 1. FIG. 1 sets forth an example line drawing of a computing system configured for health signature based load shifting for part longevity in accordance with embodiments of the present disclosure. The example of FIG. 1 includes a computing system 100 including a processor 102, memory 104, and multiple redundant parts 106. The computing system of FIG. 1 is configured to shift load between the redundant parts based on a generated health signature for each of the redundant parts.

The example computing system 100 of FIG. 1 may be any computing system configured with multiple of the same redundant part. The redundant parts 106 may be any type of part included within a computing system for redundancy. For example, the redundant parts 106 may be a power supply unit (PSU), a power distribution unit (PDU), network interface cards (NIC), PCI devices coupled to the computing system, or any other computing system component or device configured to provide redundancy. The redundant parts 106 are shown in FIG. 1 as being included within the computing system 100. In other embodiments, the redundant parts may be coupled to the computing system 100.

The processor 102 of FIG. 1 is configured to monitor one or more variables of the redundant parts 106. Examples of variables monitored may include operating conditions, such as temperature, humidity, and the like, or operating parameters, such as usage, workload executions, voltage, power consumption, error rates, and the like. In other embodiments, the variables may include information about the part such as the type and model number of the part, the age of the part, and the like. In another embodiment, the variables monitored may include usage of components within each of the redundant parts (such as the number of times a relay has switched, etc.), temperature readings at different positions within each redundant part, a current (or a voltage) level within each redundant part, and the like. Such variables may be different across redundant parts even when under a similar load, which could cause redundant parts to wear out at different rates. In one embodiment, the redundant parts may include multiple redundant PSUs, and the processor is configured to monitor the usage, temperature, and error rate associated with each of the PSUs. In another embodiment, the redundant parts include multiple redundant power distribution units (PDUs), and the processor is configured to monitor the age, make and model, usage, and power consumption of each PDU.

The processor 102 of FIG. 1 is also configured to generate a health signature for each of the redundant parts 106. The health signature indicates the overall health of each part, and is based on one or more of the monitored variables of the redundant parts. In one embodiment, the health signature includes a health score associated with each of the monitored variables of the part, where each health score indicates the health of a particular aspect of the part. The health scores may be in the form of a percentage, a fraction, or some other number indicative of the health of the part. In one embodiment, the health signature includes a vector comprising multiple elements in a single column, where each element in the vector is a health score of each monitored variable associated with the part. Continuing with the above example, the processor is configured to, after monitoring the variables of the redundant PSUs, generate a health signature in the form of a vector for each of the PSUs. In such an example, generating the health signatures includes generating a health score for each of the monitored variables (usage, temperature, and error rate) for the PSUs, and include each of the health scores as elements in a single vector (with each vector forming a different health signature for each PSU). In another embodiment, the vector may include all of the monitored variables for a particular part (without generating a health score). In such an embodiment, the vectors of each redundant part could be compared and shift the load to best balance the values of all of the variables for each redundant part.

The processor 102 of FIG. 1 is also configured to shift the load between the plurality of redundant parts. Shifting the load between the plurality of redundant parts is performed based on the health signatures of the redundant parts. The load is any output or parameter performed or describing a part during operation. For a PSU, the load may include a supplied voltage, a power consumption, or the like. For a processor, the load may include an actual workload being executed or carried out by the processor, or a power level of the processor, a power consumption limit, and the like. Shifting the load may be carried out according to various embodiments. In one example, shifting the load includes switching the load from one redundant part to another redundant part based on the health signatures of the redundant parts. In such an example, the switching of the load may occur such that parts run for a different amount of time to balance the health signatures (e.g., for two PSUs, one PSU may take the load 55% of the time and the other PSU may take the load the other 45% of the time). The amount of time each part operates to carry the load may change over time (e.g., later in the life of the component, the two PSUs may be at a 58/42% split instead of the 55/45% split listed above).

In another example, where the two PSUs are operating simultaneously, we may alter their output such that one is outputting 60% of the power load for the system it's connected to and the other PSU is outputting 40% of the load. This may balance the overall health signatures of the two PSUs better than a 50/50 split. These numbers may change over time as well (e.g., later in the life of the component, the PSUs may be at a 63/37% split instead of 60/40 as listed above).

Typically, as parts carry out a load (such as executing workloads, providing stable power to a system, generate power, or generally carry out its intended functions, etc.) they wear down, age, and generally decrease in performance over time. That is, as parts age and carry more load, the overall health of the redundant parts decreases. In an example system where one redundant part is used more than the others of the same type, the part being used more frequently experiences a larger decline in health relative to the other redundant parts used less frequently. In another embodiment, parts that are used the same amount of time may still wear out at different rates due to component tolerances and differences within the part or some other variable. Eventually, the health of the part in use will decrease to a value significantly lower than the remaining parts. Once the difference in health between the parts is large enough (meets a threshold), the load is shifted to a different part. By shifting the load between parts, the system allows for all of the redundant parts to age at a similar rate, and the health of all of the parts decreases evenly with each other. Shifting the load may include determining which part to shift the load to, which may be determined based on the health of each part. For example, the system is configured to shift the load to the part with the highest health (i.e., the most healthy part according to the health signatures), so that as the load is shifted between each part, the parts all collectively decline in health at a similar rate.

In another embodiment, the system of FIG. 1 is configured to, as part of shifting the load, share a portion of the load with another part. For example, the system is configured to shift a portion of the load to another part having a higher health signature to decrease the rate of health decline for the part experiencing the load.

In another embodiment, the system of FIG. 1 is configured to, as part of shifting the load, change one or more operating parameters of the part experiencing out the load. For example, if a part carrying out the load is determined to have a health signature that is significantly lower than the other redundant parts, the part may be altered so as to slow down the rate of health decline when carrying the load. In one embodiment, a PSU that is experiencing a load may be altered to operate a power mode the consumes less power or operates at a lower temperature in order to decrease the rate at which the part's health declines during operation. In another embodiment, if one PSU is operating at a higher temperature, the PSU may be used less frequently to even out the rate of aging for all of the redundant PSUs. In another embodiment, the load could be split between multiple parts at different loads (such as a 60/40% split across two redundant parts) such that the part that was previously declining faster than the other part is now outputting less power. In such an embodiment, the load split across the parts brings the parts back towards equal health signatures.

After shifting the load, the system of FIG. 1 is configured to continue monitoring the variables of the parts and update the health signatures over time. By keeping the health signatures updated based on recently monitored data, the system can more accurately determine how and when to shift the load again based on periodically comparing the health signatures of the redundant parts. The health signatures may be updated continuously or periodically (where the period is user selectable or automatically determined by the processor). Similarly, the comparing of the health signatures may be carried out continuously or periodically (where the period is user selectable or automatically determined by the processor).

Figure 2:
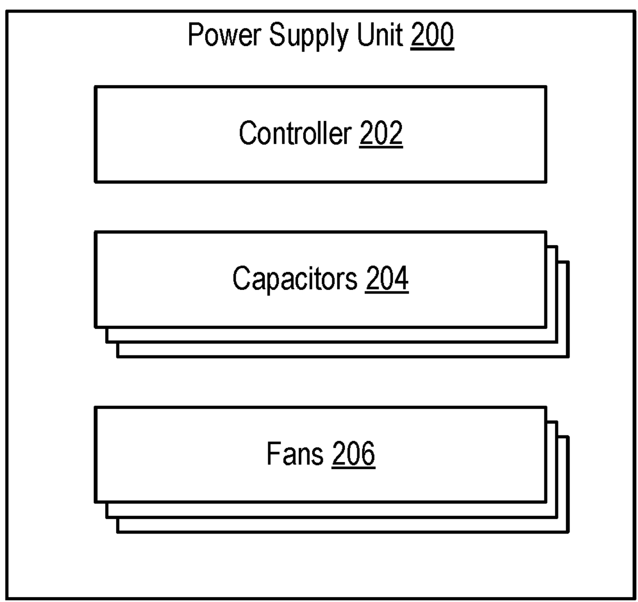
FIG. 2 shows an example line drawing of another system configured for health signature based load shifting for part longevity in accordance with embodiments of the present disclosure.

For further explanation, FIG. 2 sets forth an example line drawing of another system configured for health signature based load shifting for part longevity in accordance with embodiments of the present disclosure. The system of FIG. 2 shows a power supply unit (PSU) 200 including a controller 202, multiple capacitors 204, and multiple fans 206. In another embodiment, any type of redundant components or parts may be included within the system of FIG. 2, such as fans, capacitors, relays, transformers, and the like. The system of FIG. 2 differs from the system of FIG. 1 in that the system of FIG. 2 considers multiple redundant parts included within a single computing component, such as the depicted PSU 200. The system of FIG. 2 is configured to perform health signature based load shifting for part longevity in the same way as the methods described above with respect to FIG. 1, except that the method is performed on a smaller scale than that of system 100 in FIG. 1. That is, while the method of health signature based load shifting for part longevity performed by the system of FIG. 1 shifts load between redundant components included within a computing system, the method of health signature based load shifting for part longevity performed by the system (PSU 200) of FIG. 2 shifts load between redundant components included within a single computing device (such as the depicted PSU 200).

While FIG. 2 shows the system as a PSU, health signature based load shifting for part longevity may be performed for any other type of computing device, such as a PDU, PCIe devices, and any other device or system including multiple redundant parts. In one embodiment, the PSU 200 of FIG. 2 is configured to monitor variables of the fans, generate health signatures for each of the fans, and shift load between the fans based on the health signatures of the fans. For example, a PSU operating may have one fan begin to draw more power than the other fans included in the PSU. In such an example, the health signature of such a fan may have a lower health signature value, and so the PSU is configured to operate the fan at a lower speed than the other fans. Continuing with such an example, the PSU may be configured to increase the speed of the other fans to make up for the slower moving fan and even out the rate of aging for all of the fans.

Figure 3:
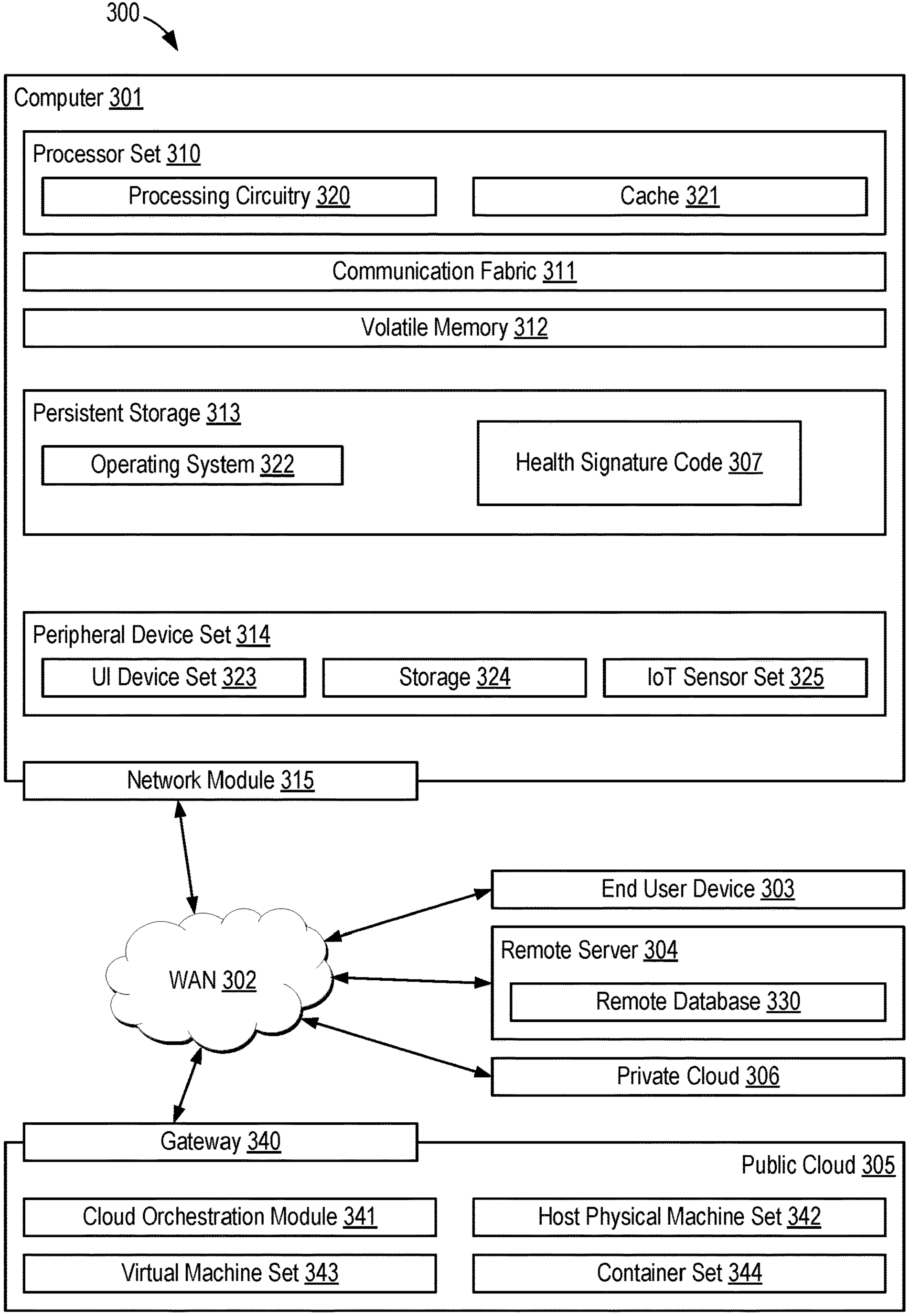
FIG. 3 is a block diagram of an example computing environment configured for health signature based load shifting for part longevity according to some embodiments of the present disclosure.

For further explanation, FIG. 3 sets forth a block diagram of computing environment 300 configured for inspecting and cleaning optical interconnects in accordance with embodiments of the present disclosure. Computing environment 300 contains an example of an environment for the execution of at least some of the computer code involved in performing the inventive methods, such as health signature code 307. In addition to health signature code 307, computing environment 300 includes, for example, computer 301, wide area network (WAN) 302, end user device (EUD) 303, remote server 304, public cloud 305, and private cloud 306. In this example embodiment, computer 301 includes processor set 310 (including processing circuitry 320 and cache 321), communication fabric 311, volatile memory 312, persistent storage 313 (including operating system 322 and health signature code 307, as identified above), peripheral device set 314 (including user interface (UI) device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

Computer 301 may take the form of a desktop computer, laptop computer, tablet computer, smart phone, wearable computer, smart watch, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 301, to keep the presentation as simple as possible.

Processor set 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in health signature code 307 in persistent storage 313.

Communication fabric 311 is the signal conduction path that allows the various components of computer 301 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 312 is any type of volatile memory now known or to be developed in the future. Examples include dynamic type random access memory (RAM) or static type RAM. Typically, volatile memory 312 is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

Persistent storage 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid state storage devices. Operating system 322 may take several forms, such as various known proprietary operating systems or open source Portable Operating System Interface-type operating systems that employ a kernel. The code included in health signature code 307 typically includes at least some of the computer code involved in performing the inventive methods.

Peripheral device set 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

Network module 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN 302 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 303 is any computer system that is used and controlled by an end user (for example, a customer of an enterprise that operates computer 301) and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

Remote server 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

Public cloud 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

Figure 4:
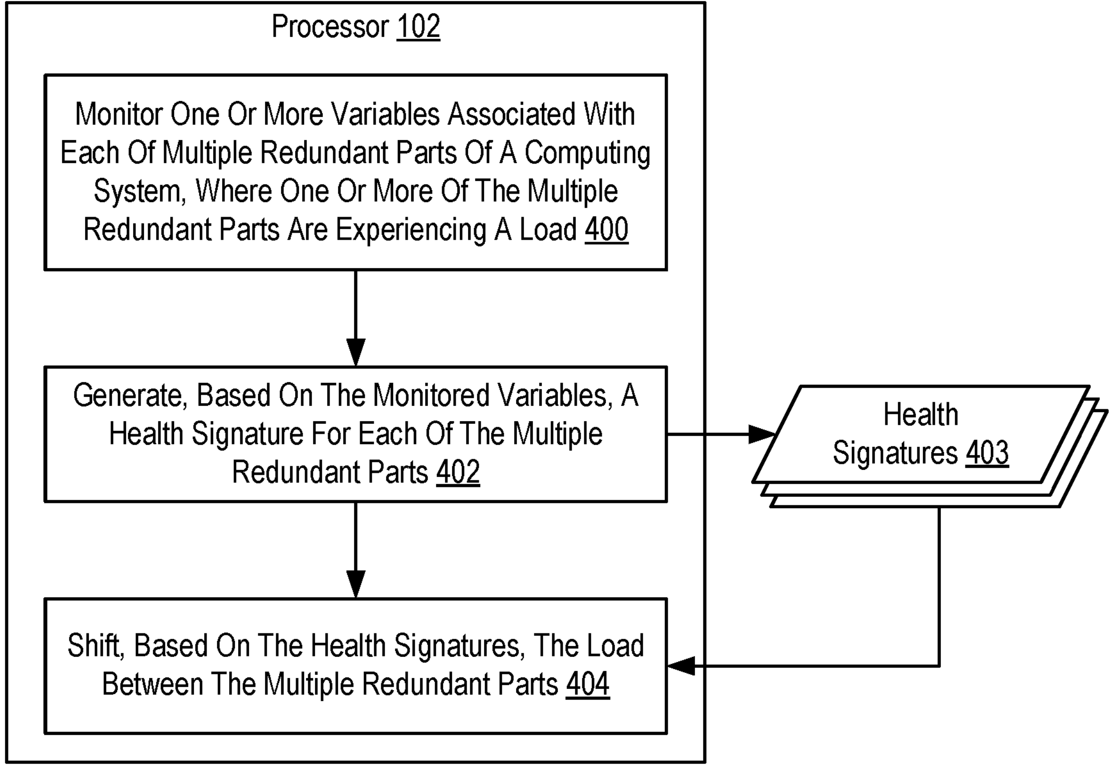
FIG. 4 is a flowchart of an example method for health signature based load shifting for part longevity according to some embodiments of the present disclosure.

For further explanation, FIG. 4 sets forth a flow chart illustrating an exemplary method of health signature based load shifting for part longevity according to embodiments of the present disclosure. The method of FIG. 4 includes monitoring 400 one or more variables associated with each of multiple redundant parts of a computing system, where one or more of the multiple redundant parts are experiencing a load. Monitoring 400 one or more variables associated with each of multiple redundant parts may be carried out by the processor 102 (or a controller) of the computing system or device by collecting and storing data describing the one or more variables of the redundant parts. The one or more variables may describe any operating parameter or health status indicator associated with the part, such as temperature, the type and model number of the part, the age of the part, the usage rate of the part, the total amount of usage of the part, and the like. For example, a computing system may include multiple redundant PSUs, and the processor is configured to monitor the usage, temperature, and errors associated with each of the PSUs.

The method of FIG. 4 also includes generating 402, based on the monitored variables, a health signature for each of the multiple redundant parts. Generating 402 the health signatures 403 may be carried out by the processor 102 (or a controller) of the computing system or device by generating health scores associated with each monitored variable and include each of the health scores as elements of a vector (such as a single column matrix). Continuing with the above example, the processor is configured to, after monitoring the variables of the redundant PSUs, generate a health signature in the form of a vector for each of the PSUs. In such an example, generating the health signatures includes generating a health score for each of the monitored variables (e.g., usage, temperature, and errors) for the PSUs, and include each of the health scores as elements in a single vector (with each vector forming a health signature for a different PSU).

The method of FIG. 4 also includes shifting 404, based on the health signatures, the load between the multiple redundant parts. Shifting 404 the load between the multiple redundant parts may be carried out by the processor 102 (or a controller) of the computing system or device based on the generated health signatures 403 by changing one or more operating parameters of one or more redundant parts currently experiencing at least a portion of the load. For example, in a system with multiple redundant PSUs, the health signatures of the PSUs may indicate that one of the PSUs has a lower health score than the other PSUs. In such an example, the system is configured to alter the operating parameters of that PSU to decrease the rate at which the PSU's health declines while it is operating. In such an example, as the system continues to utilize all of the PSUs (at varying loads according to the load shifting), the PSU whose parameters were altered will age more slowly than the other PSUs to allow the overall health of each PSU to even out over time. In another embodiment, shifting the load may include periodically alternating between each of the multiple redundant parts. For example, the system is configured to determine how long each PSU operates when cycling through all of the PSUs, and may even out the longevity of all of the PSUs by causing the PSUs which age faster to be used less often.

In another embodiment, shifting the load may be based on predicting an upcoming workload to be carried out by one or more of the redundant parts. For example, the system is configured to take into account known or predicted upcoming workloads and shift the load between the redundant parts based on the predicted workload (and the health signatures) to allow for all of the redundant parts to evenly age over time. In an example where the parts are switched for each executed workload, a system may be configured to predict a large upcoming workload and shift the load so that the larger workload is not executed by a redundant part that has a lower health score than the other parts, so as to even out the health of the parts as they age.

Figure 5:
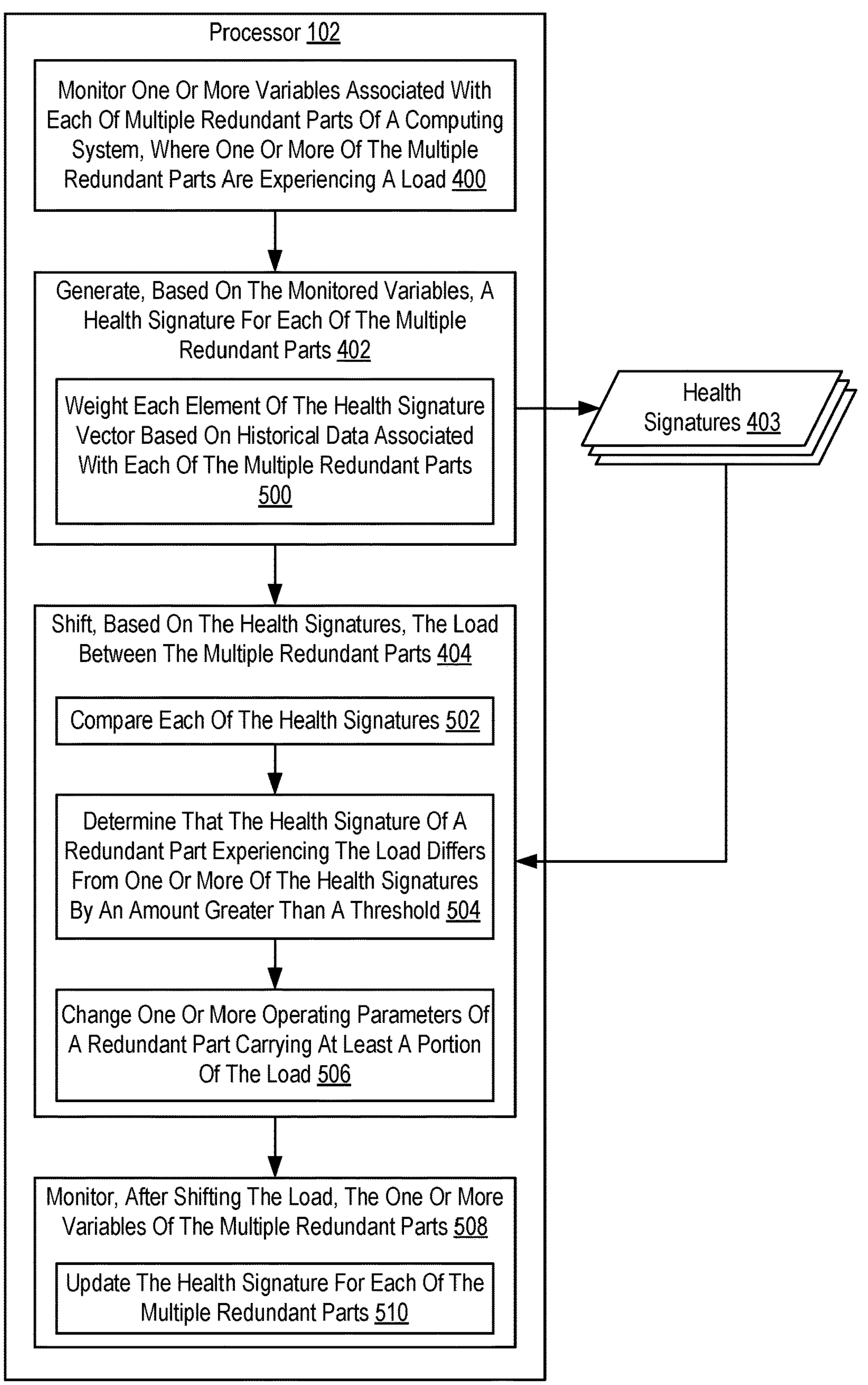
FIG. 5 is a flowchart of another example method for health signature based load shifting for part longevity according to some embodiments of the present disclosure.

For further explanation, FIG. 5 sets forth a flow chart illustrating another exemplary method of health signature based load shifting for part longevity according to embodiments of the present disclosure. The method of FIG. 5 differs from the method of FIG. 4 in that the method of FIG. 5 includes, as part of generating 402, based on the monitored variables, a health signature for each of the multiple redundant parts, weighting 500 each element of the health signature vector based on historical data associated with each of the multiple redundant parts. Weighting 500 each element of the health signature vector may be carried out by the processor 102 (or a controller) of the computing system or device by multiplying each element of the vector by a determined value based on previously recorded data associated with each of the multiple redundant parts. Such a value may be user selectable or may be automatically determined by the processor. For example, after monitoring the usage, temperature, and errors of multiple redundant PSUs, the processor may determine, based on previously recorded data for the PSUs, how much each variable impacts the health of a PSU, and then weight the generated health scores associated with each monitored variable accordingly. By weighting each element of the health signature vector, the heath signature can more accurately reflect the health of a part by taking into account how much each element of the monitored variables impacts the health of that particular part. Weighting each element may also consider metrics from vendor datasheets associated with the part or with the components within each part. For example, a fan may be spec'd to run at 100% PWM for 50,000 hours. In such an example, the processor may determine the speed the fan was running at and for how long the fan was running since the last check to determine a health score based on how close the fan is to that spec'd value. In another example, where a relay within a redundant part is spec'd for 100,000 switches, the health score may be a percentage against the spec of the number of times the relay has switched during operation.

The method of FIG. 5 also includes, as part of shifting 404, based on the health signatures, the load between the multiple redundant parts, comparing 502 each of the health signatures. Comparing 502 each of the health signatures 403 may be carried out by the processor 102 (or a controller) of the computing system or device by comparing each health signature vector and calculating the difference between each redundant part. The calculated difference between each redundant part may be based on each element of the vectors. That is, the difference may be the average of the differences between each health score of the various elements of the vector, the difference may be the largest discrepancy between health scores, or the difference may be the sum of all of the differences between each health score. In one embodiment, the system is configured to calculate the Euclidian distance (with respect to the health signature vectors) between each redundant part and determine which part differs from the other parts by the highest Euclidian distance. By determining which part is the outlier in the group of parts with respect to part health, the system may shift the load to bring the health of that part closer in line with the other parts, to keep all of the parts aging at a similar rate, and thus increase part longevity.

The method of FIG. 5 also includes, as part of shifting 404, based on the health signatures, the load between the multiple redundant parts, determining 504 that the health signature of a redundant part experiencing the load differs from one or more of the health signatures by an amount greater than a threshold. Such a determination 504 may be carried out by the processor 102 (or a controller) of the computing system or device responsive to comparing each health signature vector and calculating the difference between each redundant part. Continuing with the above example, the system is configured to compare each of the calculated Euclidian distances (or some other calculated difference between each part) with a threshold value. The system is configured to shift the load only when the part experiencing the load declines in health enough to cause a health score discrepancy (with respect to the other parts) larger than a threshold amount. By relying on a threshold difference for shifting load, the system is configured to shift load only when the parts' health differs from one another by a large enough amount. Such a threshold may be user selectable or may be automatically determined by the processor. Such methods of shifting the loads between redundant parts based on a threshold difference between health signatures prevents excessive load shifting and increases system efficiency.

The method of FIG. 5 also includes, as part of shifting 404, based on the health signatures, the load between the multiple redundant parts, changing 506 one or more operating parameters of a redundant part experiencing at least a portion of the load. Changing 506 one or more operating parameters of a redundant part experiencing at least a portion of the load may be carried out by the processor 102 (or a controller) of the computing system or device in response to determining that the part experiencing the load differs from one or more of the health signatures of the other parts by an amount greater than the threshold. For example, if a part experiencing the load is determined to have a health signature that is significantly lower than the other redundant parts, the part may be altered so as to slow down the rate of health decline when experiencing the load. In one embodiment, a PSU that is supplying a load may be altered to operate a power mode the consumes less power or operates at a lower temperature in order to decrease the rate at which the part's health declines during operation. In another embodiment, if one PSU is operating at a higher temperature, the PSU may be used less frequently to even out the rate of aging for all of the redundant PSUs.

The method of FIG. 5 also includes monitoring 508, after shifting the load, the one or more variables of the multiple redundant parts. Monitoring 508 the one or more variables of the multiple redundant parts may be carried out by the processor 102 (or a controller) of the computing system or device after shifting the load. The method of FIG. 5 also includes updating 510 the health signature for each of the multiple redundant parts. Updating 510 the health signatures of the redundant parts may be carried out by the processor 102 (or a controller) of the computing system or device by using the most recently obtained data from monitoring the variables to update the health signatures. The health signatures may include a health score based on an average of the data for each of the monitored variables taken over a period of time. By keeping the health signatures updated based on recently monitored data, the system can more accurately determine how and when to shift the load again based on periodically comparing the health signatures of the redundant parts. The health signatures may be updated continuously or periodically (where the period is user selectable or automatically determined by the processor). Similarly, the comparing of the health signatures may be carried out continuously or periodically (where the period is user selectable or automatically determined by the processor).

In view of the explanations set forth above, readers will recognize that the benefits of health signature based load shifting for part longevity according to embodiments of the present disclosure include:

- Increasing system efficiency by increasing part longevity by shifting load between redundant parts to maintain an even health across all of the parts.
- Increasing part longevity by preventing any single part from degrading faster than other parts in the system.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:
- monitoring one or more variables associated with each of a plurality of redundant parts of a computing system, wherein one or more of the plurality of redundant parts are experiencing a load;
- generating, based on the monitored one or more variables, a health signature for each of the plurality of redundant parts to obtain health signatures; and
- shifting, based on the health signatures, the load between the plurality of redundant parts,
- wherein shifting the load comprises:
  - performing, by a first redundant part of the plurality of redundant parts, a first portion of the load; and
  - performing, by a second redundant part of the plurality of redundant parts, a second portion of the load.

2. The method of claim 1, further comprising monitoring, after shifting the load, the one or more variables of the plurality of redundant parts, including updating the health signature of each of the plurality of redundant parts.

3. The method of claim 1, wherein the health signature is a vector, with each element of the vector corresponding to a different variable of the one or more variables.

4. The method of claim 3, wherein generating the health signature for each of the plurality of redundant parts includes weighting each element of the vector based on historical data associated with each of the plurality of redundant parts.

5. The method of claim 3, wherein shifting the load is based on comparing each of the health signatures.

6. The method of claim 5, wherein shifting the load is performed in response to determining that the health signature of a redundant part, of the plurality of redundant parts, experiencing the load differs from one or more of the health signatures of one or more other redundant parts, of the plurality of redundant parts, by an amount greater than a threshold.

7. The method of claim 6, wherein the threshold is based on an allowed Euclidian distance between the vectors.

8. The method of claim 1, wherein shifting the load is based on a predicted upcoming workload.

9. The method of claim 1, wherein shifting the load includes changing one or more operating parameters of a redundant part experiencing at least a portion of the load.

10. The method of claim 1, wherein shifting the load includes periodically alternating between each of the plurality of redundant parts carrying a portion of the load.

11. A computing system comprising:
- memory;
- a plurality of redundant parts, wherein one or more of the plurality of redundant parts are experiencing a load; and
- a processor configured to:
  - monitor one or more variables associated with each of the plurality of redundant parts;
  - generate, based on the monitored one or more variables, a health signature for each of the plurality of redundant parts to obtain the health signatures; and
  - shift, based on the health signatures, the load between the plurality of redundant parts,
  - wherein:
    - a first redundant part, of the plurality of redundant parts, performs a first portion of the load as a result of the load being shifted; and
    - a second redundant part, of the plurality of redundant parts, performs a second portion of the load as a result of the load being shifted.

12. The computing system of claim 11, wherein each of the plurality of redundant parts comprises a power supply unit (PSU).

13. The computing system of claim 11, wherein each of the plurality of redundant parts comprises a power distribution unit (PDU).

14. The computing system of claim 11, wherein the processor is further configured to monitor, after shifting the load, the one or more variables of the plurality of redundant parts, including updating the health signature of each of the plurality of redundant parts.

15. The computing system of claim 11, wherein the health signature is a vector, with each element of the vector corresponding to a different variable of the one or more variables.

16. The computing system of claim 15, wherein, when generating the health signature for each of the plurality of redundant parts, the processor is to weight each element of the vector based on historical data associated with each of the plurality of redundant parts.

17. The computing system of claim 15, wherein shifting the load is based on the processor comparing each of the health signatures.

18. The computing system of claim 17, wherein shifting the load is performed in response to the processor determining that the health signature of a redundant part, of the plurality of redundant parts, experiencing the load differs from one or more of the health signatures of other redundant parts, of the plurality of redundant parts, by an amount greater than a threshold.

19. The computing system of claim 18, wherein the threshold is based on an allowed Euclidian distance between the vectors.

20. A computer program product comprising a computer readable storage medium and computer program instructions stored in the computer readable storage medium that, when executed, are configured to:
- monitor one or more variables associated with each of a plurality of redundant parts of a computing system, wherein one or more of the plurality of redundant parts are experiencing a load;
- generate, based on the monitored one or more variables, a health signature for each of the plurality of redundant parts to obtain health signatures; and
- shift, based on the health signatures, the load between the plurality of redundant parts, wherein the computer program instructions, that when executed shifting the load, are configured to cause:

a first redundant part, of the plurality of redundant parts, to perform a first portion of the load; and a second redundant part, of the plurality of redundant parts, to perform a second portion of the load.

* * * * *